US009557772B1

(12) United States Patent
Xin et al.

(10) Patent No.: US 9,557,772 B1
(45) Date of Patent: Jan. 31, 2017

(54) ELECTRONIC DEVICE

(71) Applicant: Lenovo (Beijing) Co., Ltd., Beijing (CN)

(72) Inventors: Zhifeng Xin, Beijing (CN); Xiaosong Xia, Beijing (CN)

(73) Assignee: LENOVO (BEIJING) CO., LTD., Haidian District, Beijing (CN)

( * ) Notice: Subject to any disclaimer, the term of this patent is extended or adjusted under 35 U.S.C. 154(b) by 0 days.

(21) Appl. No.: 14/832,418

(22) Filed: Aug. 21, 2015

(30) Foreign Application Priority Data

Jul. 21, 2015 (CN) .......................... 2015 1 0432354
Jul. 21, 2015 (CN) .......................... 2015 1 0432395

(51) Int. Cl.
*G06F 1/16* (2006.01)

(52) U.S. Cl.
CPC ........... *G06F 1/1652* (2013.01); *G06F 1/1647* (2013.01); *G06F 1/1654* (2013.01); *G06F 1/1618* (2013.01); *G06F 1/1643* (2013.01)

(58) Field of Classification Search
CPC .... G06F 1/1618; G06F 1/1652; G06F 1/1654; G06F 1/1681; G06F 1/1692; G06F 1/1647; G06F 1/1649; G06F 1/165; G06F 1/1643
USPC ................ 361/679.01–679.3, 679.55–679.59
See application file for complete search history.

(56) References Cited

U.S. PATENT DOCUMENTS

| 7,283,353 | B1* | 10/2007 | Jordan | G06F 1/1601 |
| | | | | 248/122.1 |
| 7,345,872 | B2* | 3/2008 | Wang | G06F 1/1618 |
| | | | | 16/354 |
| 9,173,287 | B1* | 10/2015 | Kim | H05K 1/028 |
| 2002/0067339 | A1* | 6/2002 | Min | G06F 1/1601 |
| | | | | 345/156 |
| 2008/0112113 | A1* | 5/2008 | Sawadski | H04M 1/0218 |
| | | | | 361/679.27 |
| 2012/0147535 | A1* | 6/2012 | Ahn | G06F 1/1641 |
| | | | | 361/679.01 |
| 2013/0070431 | A1* | 3/2013 | Fukuma | G06F 1/1652 |
| | | | | 361/749 |
| 2013/0219663 | A1* | 8/2013 | Cai | G06F 1/1681 |
| | | | | 16/371 |
| 2014/0101578 | A1* | 4/2014 | Kwak | G06F 3/017 |
| | | | | 715/761 |
| 2014/0226275 | A1* | 8/2014 | Ko | G06F 1/1626 |
| | | | | 361/679.27 |
| 2015/0023030 | A1* | 1/2015 | Tsukamoto | G06F 1/1652 |
| | | | | 362/419 |
| 2015/0361696 | A1* | 12/2015 | Tazbaz | H04M 1/022 |
| | | | | 361/679.27 |

* cited by examiner

Primary Examiner — Nidhi Thaker
(74) Attorney, Agent, or Firm — Brinks Gilson & Lione; G. Peter Nichols

(57) ABSTRACT

An electronic device has a first body; a second body; a rotating device rotatably connecting the first body and the second body; and an enclosing mechanism enclosing at least a part of the rotating device.

13 Claims, 9 Drawing Sheets

ELECTRONIC DEVICE

This application claims priority to Chinese patent application No. 201510432354.8 filed on Jul. 21, 2015 and to Chinese patent application No. 201510432395.7 filed on Jul. 21, 2015; the entire contents of which are incorporated herein by reference.

BACKGROUND

In the related art, one type of electronic device (e.g., portable computer) generally includes a real physical keyboard part and a display part, the two parts are connected together by a fixed rotating device and can be rotated and located relative to each other, wherein the real physical keyboard part can be only used for inputting operation instructions of a user, and the display part is merely used for displaying interactive information.

In the above type of electronic device, since the real physical keyboard part and the display part are connected together by the fixed rotating device, they cannot be detached from each other for separation. In addition, as the real physical keyboard part can be only used for inputting operation instructions of the user, and only the display part is used for displaying interactive information, a display area is decreased, resulting in decreased display information, which brings a lot of inconvenience to the user when needing to display a large amount of information. In addition, due to the real physical keyboard, the overall size of the keyboard part and the size of each key are fixed. In this way, corresponding adjustment is hard to make according to the operation habits of each user. Further, the way of applying this type of electronic device by users is unitary.

In the related art, another type of electronic device includes a display part and a real physical keyboard part which are detachably connected together. Although the display part and the real physical keyboard part are separable, due to the existence of the real physical keyboard part, the size of this type of electronic device is larger, and thus the portability thereof is reduced.

In the related art, there is also a type of electronic device which only includes a display part, for example, an iPad tablet computer proposed by the US Apple Computer Inc. in 2010, the display part thereof is both used for displaying interactive information and used for displaying a virtual keyboard to enable the user to input operation instructions.

In the above type of electronic device, since the display part thereof is both used for displaying the interactive information and used for displaying the virtual keyboard, the display area is decreased, resulting in decreased display information, which brings a lot of inconvenience to the user when needing to display a large amount of information. In addition, this type of electronic device generally needs to be held by one hand of the user, while the other hand is used for inputting the operation instructions. When needing to input a large number of operation instructions, this type of electronic device also needs an additional supporting device, for example, a bracket, and an additional external keyboard, for example, a real keyboard in wired or wireless connection with the electronic device. Due to the existence of the additional supporting device and the additional external keyboard, the portability of this type of electronic device is reduced.

In addition, in the related art, these display parts generally include hard display screens, that is, unbendable display screens. Further, no display device is arranged on the rotating part in the related art, while only a rotating mechanism is arranged thereon. All these cause the unitary way of applying this type of electronic device by the user.

SUMMARY

In view of the above problems in the related art, according to a first aspect of the present disclosure, an electronic device is provided. The electronic device comprising: a first body; a second body; a rotating device rotatably connecting the first body and the second body; and an enclosing mechanism enclosing at least a part of the rotating device.

DETAILED DESCRIPTION

A detailed illustration of exemplary embodiments according to the present disclosure will be given below in combination with the accompanying drawings. By means of the accompanying drawings and corresponding text illustration, those skilled in the art will understand the features and advantages of the present disclosure.

Figure 4:
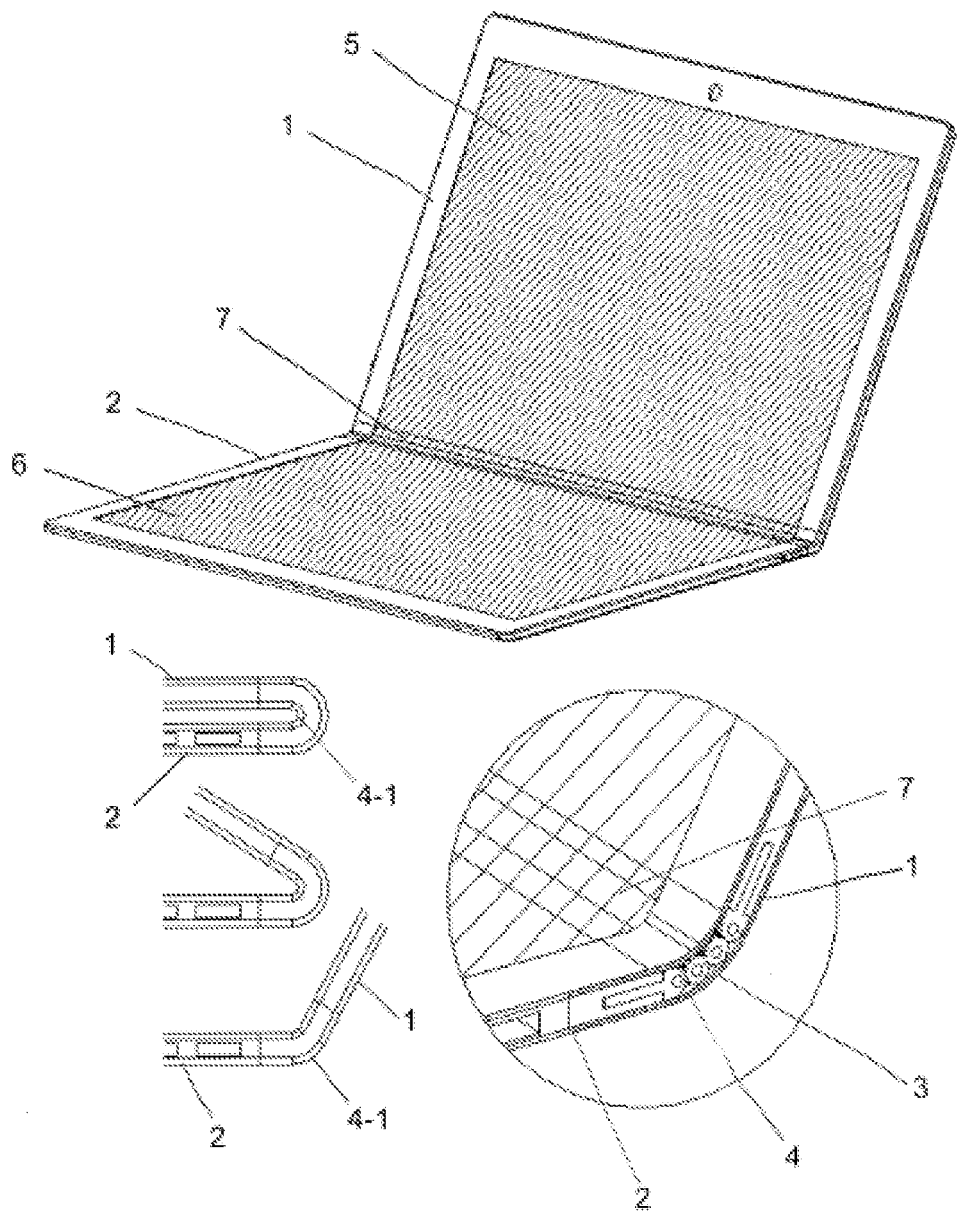
FIG. 4 shows an electronic device according to an embodiment of the present disclosure in a fourth operation mode.

According to the first aspect of the present disclosure, an electronic device is provided. As shown in FIG. 4, the electronic device includes a first body 1, a second body 2, a rotating device 3 and an enclosing mechanism 4, wherein the rotating device 3 is rotatably connected with the first body 1 and the second body 2; the first body 1 includes a first display screen 5; the second body 2 includes a second display screen 6; and the enclosing mechanism 4 encloses at least a part of the rotating device 3.

The rotating device 1 is rotated between 0 and 360 degrees.

Figure 1:
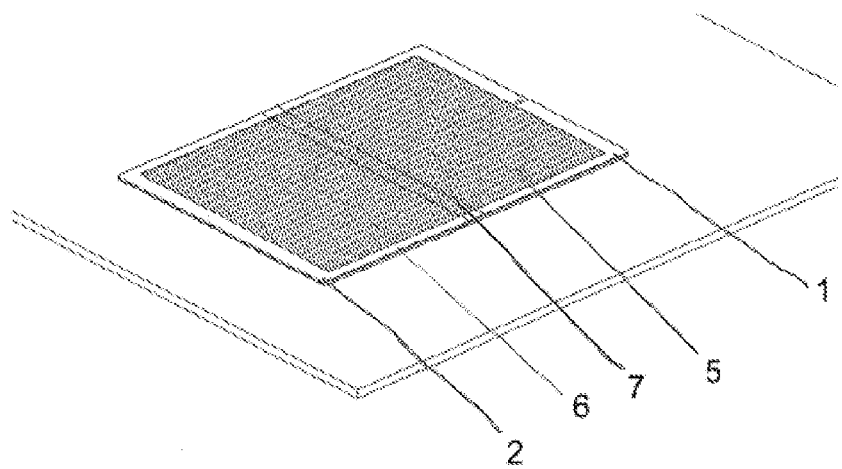
FIG. 1 shows an electronic device according to an embodiment of the present disclosure in a first operation mode.

FIG. 1 shows the electronic device according to an embodiment of the present disclosure in a first operation mode, wherein when the rotating device 3 is rotated to 180 degrees, the electronic device is in a first operation mode, and in the first operation mode, the first body 1 and the second body 2 are located on a same plane, and the first display screen 5 and the second display screen 6 show display information towards a same direction.

Figure 2:
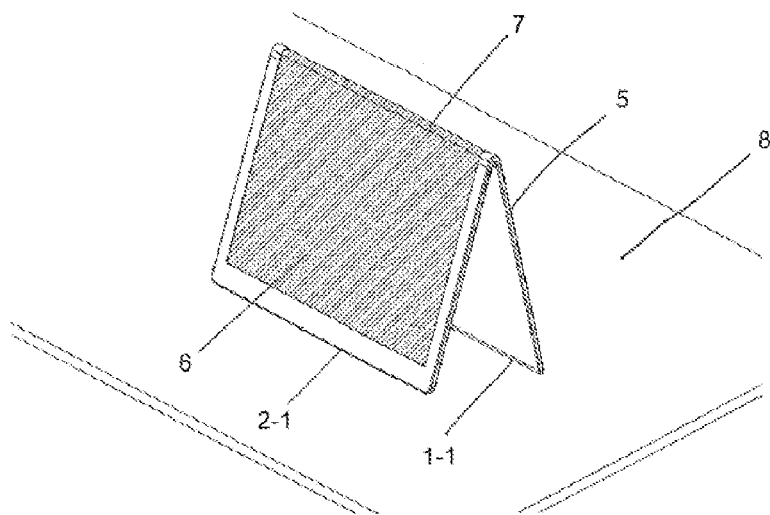
FIG. 2 shows an electronic device according to an embodiment of the present disclosure in a second operation mode.

FIG. 2 shows the electronic device according to the embodiment of the present disclosure in a second operation mode, wherein when the rotating device 3 is rotated to more than 180 degrees, the electronic device is in a second operation mode, free ends 1-1, 2-1 of the first body 1 and the second body 2 can be supported on a support surface 8, and the first display screen 5 and the second display screen 6 show display information towards two sides.

Figure 3:
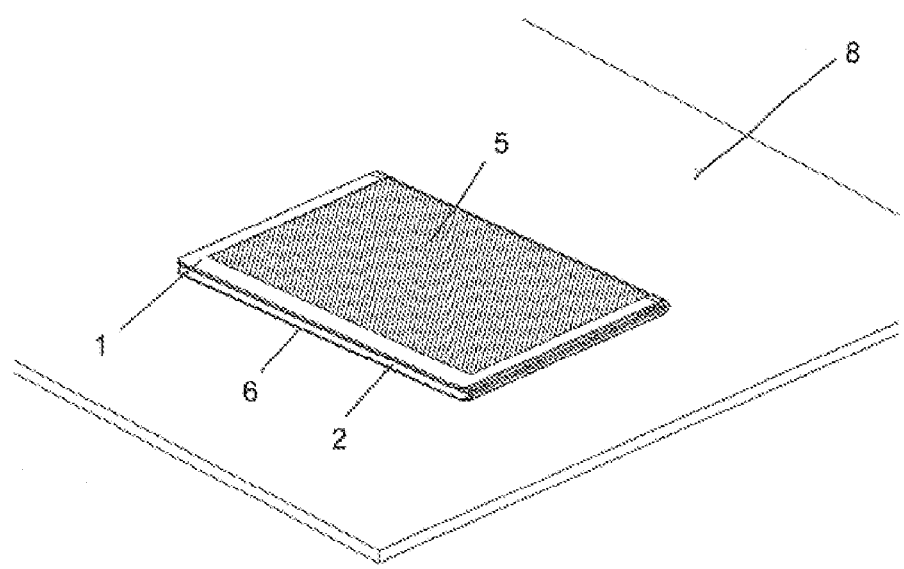
FIG. 3 shows an electronic device according to an embodiment of the present disclosure in a third operation mode.

FIG. 3 shows the electronic device according to the embodiment of the present disclosure in a third operation mode, wherein when the rotating device 3 is rotated to 360 degrees, the electronic device is in a third operation mode, the first body 1 and the second body 2 are overlapped back to back, and the first display screen 5 and the second display screen 6 show display information towards two opposite directions.

As shown in FIG. 4, the enclosing mechanism 4 is fixed on the first body 1 and the second body 2, and the tightness of the enclosing mechanism 4 changes with the rotation of the rotating device 3.

The enclosing mechanism 4 includes an elastic component 4-1, and after the elastic component is pre-stretched, the enclosing mechanism 4 is fixed between the first body 1 and the second body 2, so that when the rotating device 3 is rotated to different angles, the enclosing mechanism 4 is always fit and attached to the rotating device 3.

FIG. 4 further shows the electronic device according to the embodiment of the present disclosure in a fourth operation mode, wherein when the rotating device is rotated between 90 degrees and 180 degrees, the electronic device is in a fourth operation mode, the external surface (for example, the external surface of the second body 2 in FIG. 4) of one of the first body 1 and the second body 2 is supported on a support surface 8, and the first display screen 5 and the second display screen 6 show display information towards different directions.

Figure 5:
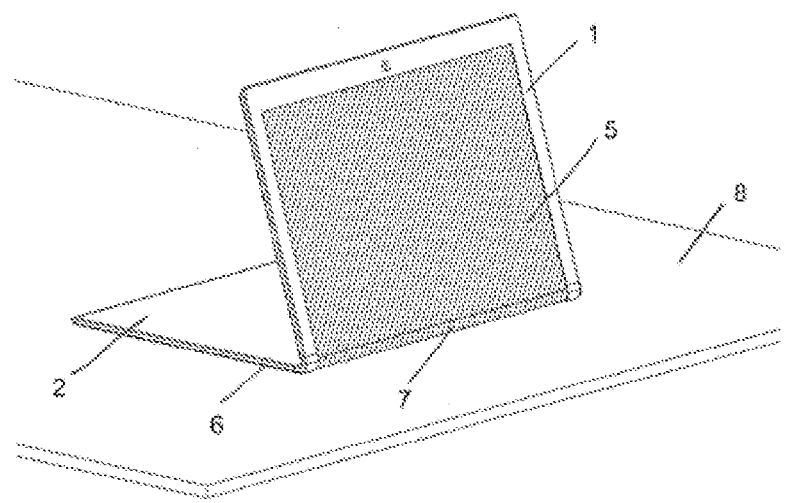
FIG. 5 shows an electronic device according to an embodiment of the present disclosure in a fifth operation mode.

FIG. 5 shows the electronic device according to the embodiment of the present disclosure in a fifth operation mode, wherein when the rotating device is rotated to more than 180 degrees, the electronic device is in a fifth operation mode, one (for example, the second display screen 6 of the second body 2 in FIG. 5) of the first display screen 5 of the first body 1 and the second display screen 6 of the second body 2 is supported on a support surface 8, and the other (for example, the first display screen 5 of the first body 1 in FIG. 5) of the first display screen 5 of the first body and the second display screen 6 of the second body is used for showing display information.

Figure 6:
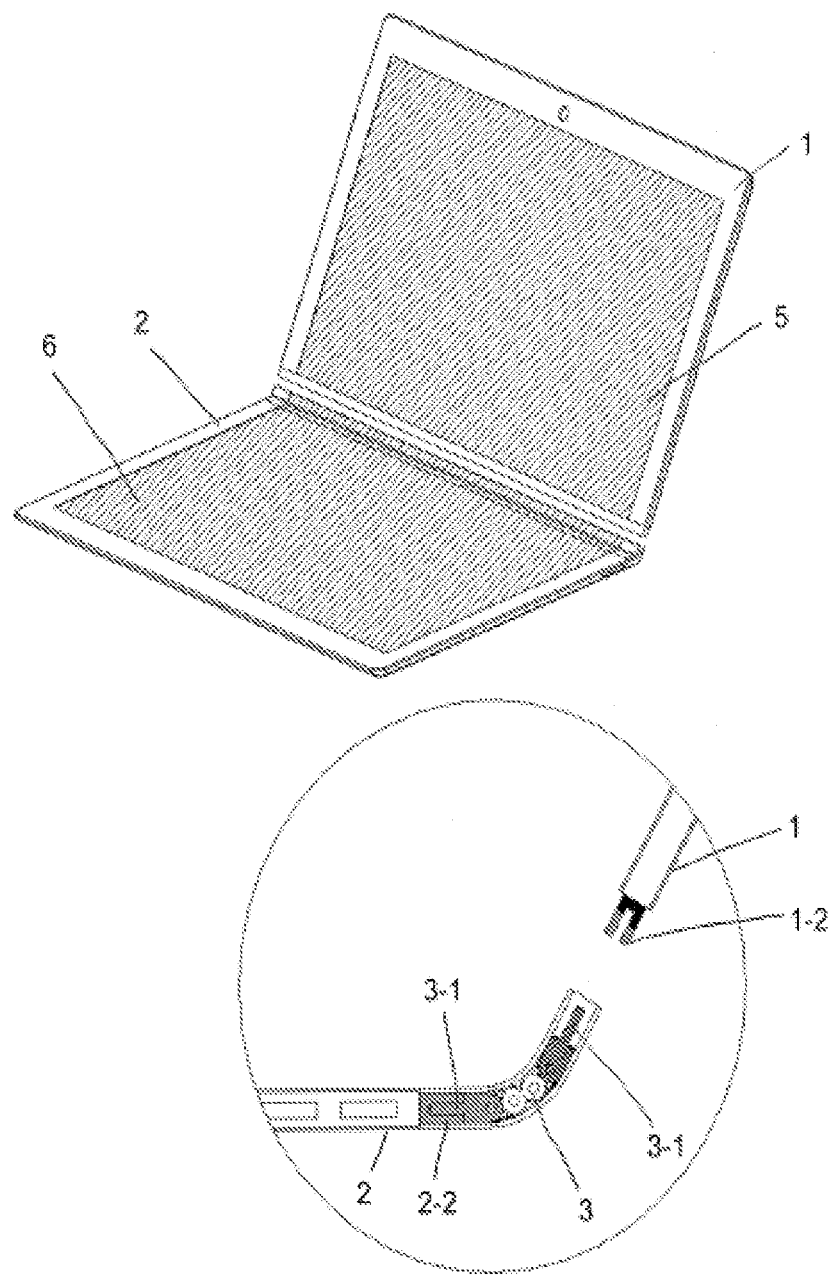
FIG. 6 shows an electronic device according to an embodiment of the present disclosure in a sixth operation mode, and further shows mortise and tenon fit formed by a matching part and a fixing part.
Figure 7:
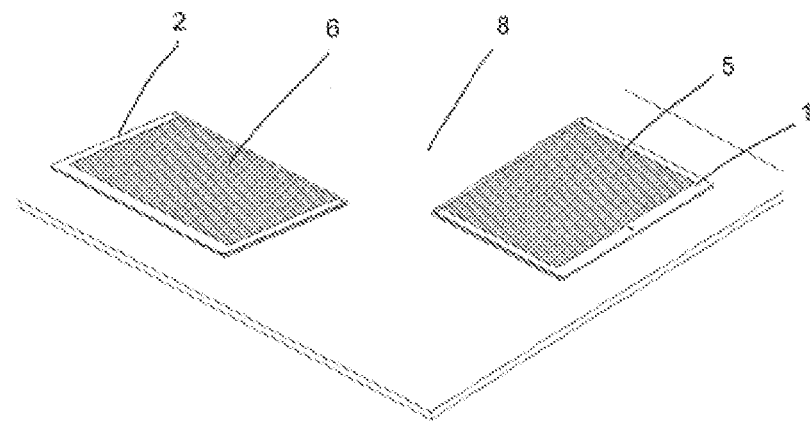
FIG. 7 shows an electronic device according to an embodiment of the present disclosure in a sixth operation mode.

FIGS. 6 and 7 show the electronic device according to the embodiment of the present disclosure in a sixth operation mode and further show mortise and tenon fit formed by a matching part and a fixing part. According to a second aspect of the present disclosure, the rotating device 3 is detachably connected with the first body 1 and the second body 2, and in the sixth operation mode, the matching part (the matching part 1-2 of the first body 1 or the matching part 2-2 of the second body 2) of at least one of the first body 1 and the second body 2 is separate from the fixing part 3-1 of the rotating device 3, so that the first display screen 5 of the first body is separate from the second display screen 6 of the second body, and the first display screen 5 and the second display screen 6 are capable of respectively showing display information.

As shown in FIG. 6, the matching part 1-2 of the first body 1 and the fixing part 3-1 of the rotating device 3 form mortise and tenon fit, and the matching part 2-2 of the second body and the fixing part 3-1 of the rotating device 3 form mortise and tenon fit.

According to a third aspect of the present disclosure, the electronic device further includes a flexible display screen 7 (see FIG. 4), and the flexible display screen 7 is arranged on the enclosing mechanism 4 and can be used for performing a touch operation and showing the display information.

According to the above aspects of the present disclosure, the rotating device 3 includes a plurality of rotating shafts (see FIGS. 4 and 6) which are arranged in parallel and are in rotary fit, so that the rotating device 3 can maintain a smooth state in a relative rotation of the first body 1 and the second body 2, such that the flexible display screen 7 also maintains the smooth state during the relative rotation. The rotary fit of the plurality of rotating shafts is achieved by gear fit.

In the relative rotation, the elastic component 4-1 also maintains the smooth state, and no wrinkle is formed on the surface of the elastic component 4-1.

The elastic component includes silica gel.

Based on the above structures of the present disclosure, since no physical keyboard exists and only the display part exists, compared with the related art, in the case of the same size, the separable first and second display screens 5, 6 can be both used for displaying interactive information, so that the display area is increased, then the area for the information to be displayed is increased, and thus much more convenience is brought to the user when a large amounts of information are required to be displayed.

In addition, since a virtual keyboard can be used, the overall size of the keyboard part and the size of each key are variable, and thus corresponding adjustment can be conveniently made according to the operation habits of each user. Further, the way of applying this type of electronic device by the user is diversified.

Based on the above structures of the present disclosure, one of the first body 1 and the second body 2 can be separate from the fixing part 3-1 of the rotating device 3, such that the first display screen 5 and the second display screen 6 are separable, and a varied way of applying this type of electronic device by the user is further achieved.

Based on the above structures of the present disclosure, when a large number of input operations are required, in some of the above modes (for example, the fourth mode), the electronic device according to the present disclosure needs no additional supporting device, for example, a bracket, and needs no additional external keyboard, for example, a physical keyboard in wired or wireless connection with the electronic device. In this way, since the additional supporting device and the additional external keyboard are unnecessary, the size and the component number of the electronic device according to the present disclosure can be decreased/reduced, and thus the portability is improved.

In addition, the electronic device according to the present disclosure includes the flexible display screen 7, namely a bendable display screen. The flexible display screen 7 can be used for displaying information (for example, including, but not limited to, prompt information) and performing the touch operation. This further achieves the diversification of applying the electronic device according to the present disclosure by the user.

Figure 13:
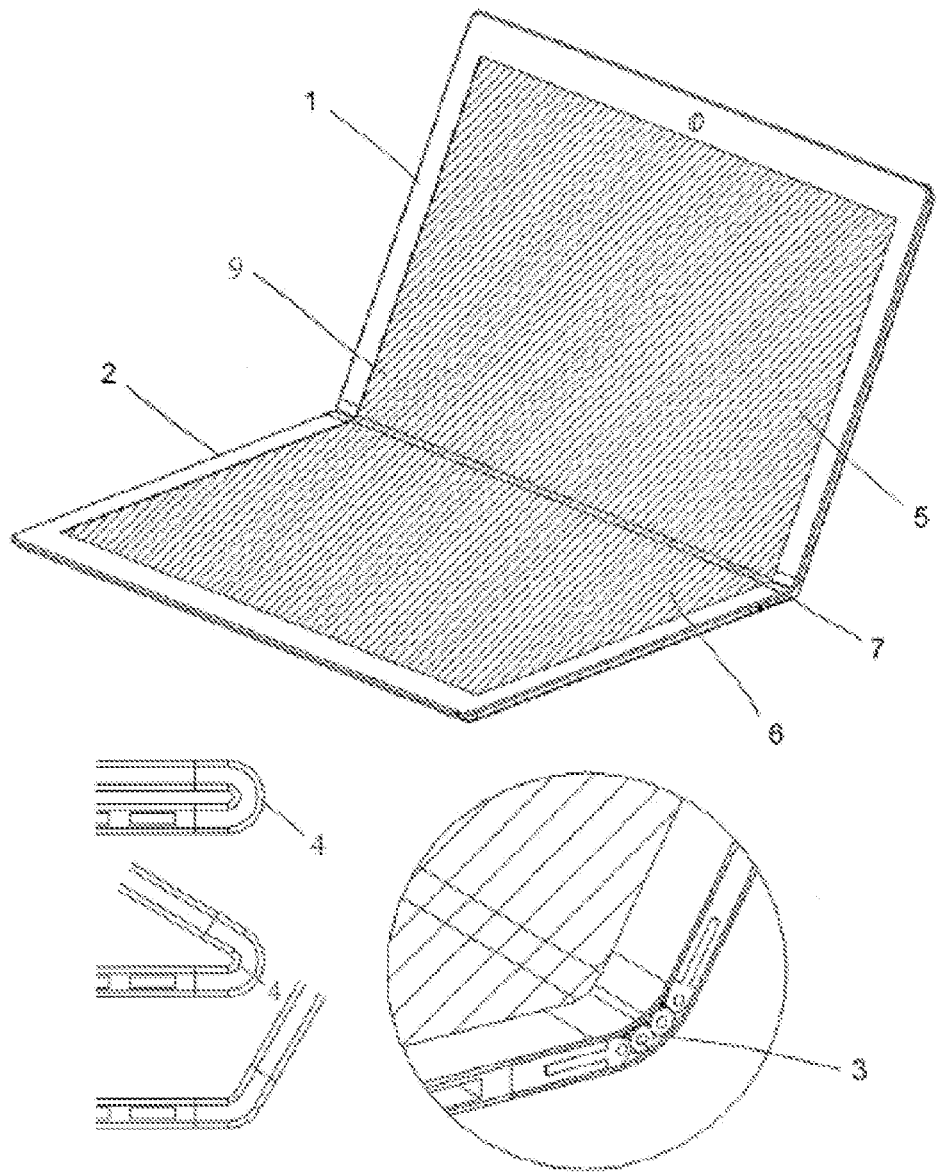
FIG. 13 shows an electronic device according to an embodiment of the present disclosure in an eighth operation mode, and further shows a rotating device of the electronic device.

According to a fourth aspect of the present disclosure, an electronic device is provided. As shown in FIG. 13, the electronic device includes a first body 1, a second body 2, a rotating device 3 and a bendable display device 9, wherein the rotating device 3 is rotatably connected with the first body 1 and the second body 2, and the bendable display device 9 encloses first sides of the first body 1, the second body 2 and the rotating device 3.

The bendable display device 9 includes a flexible display screen, and the flexible display screen encloses the first sides of the first body 1, the second body 2 and the rotating device 3.

According to a fifth aspect of the present disclosure, the bendable display device 9 can include a first display screen 5, a second display screen 6 and a flexible display screen 7; the flexible display screen 7 is connected between the first display screen 5 and the second display screen 6; the first display screen 5 encloses the first side of the first body 1; the second display screen 6 encloses the first side of the second body 2; and the flexible display screen 7 encloses the first side of the rotating device 3.

When the rotating device 3 is rotated to different angles, the flexible display screen is always fit and attached to the first side of the rotating device 3.

According to the present disclosure, the flexible display screen includes a first elastic component (not shown) connected with the first display screen and a second elastic component (not shown) connected with the second display screen.

The electronic device further includes an enclosing mechanism 4, and the enclosing mechanism 4 encloses at least a part of the rotating device 3.

The rotating device 3 is rotated between 0 and 360 degrees.

The rotating device 3 includes a plurality of rotating shafts which are arranged in parallel and are in rotary fit, so that the rotating device 3 can maintain a smooth state in a relative rotation of the first body 1 and the second body 2, and then the flexible display screen 7 also maintains the smooth state during the relative rotation.

Figure 8:
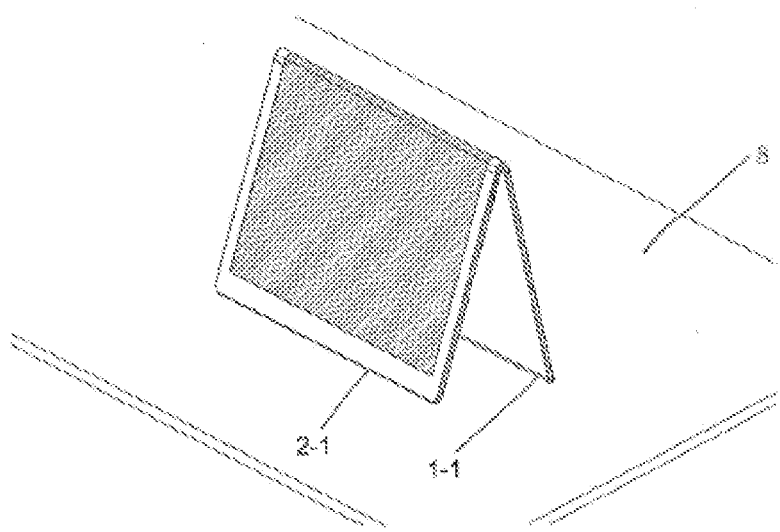
FIG. 8 shows an electronic device according to an embodiment of the present disclosure in a seventh operation mode.

When the rotating device is rotated to more than 180 degrees, as shown in FIG. 8, the electronic device according to the embodiment of the present disclosure is in a seventh operation mode; the first body 1 and the second body 2 rotate relative to each other to form a V shape, two opposite edges (1-1, 2-1) of the first body and the second body forming the V shape being supported on a support surface 8; the first display screen 5, the second display screen 6 and the flexible display screen 7 can also be used for simultaneously displaying data information.

Figure 9:
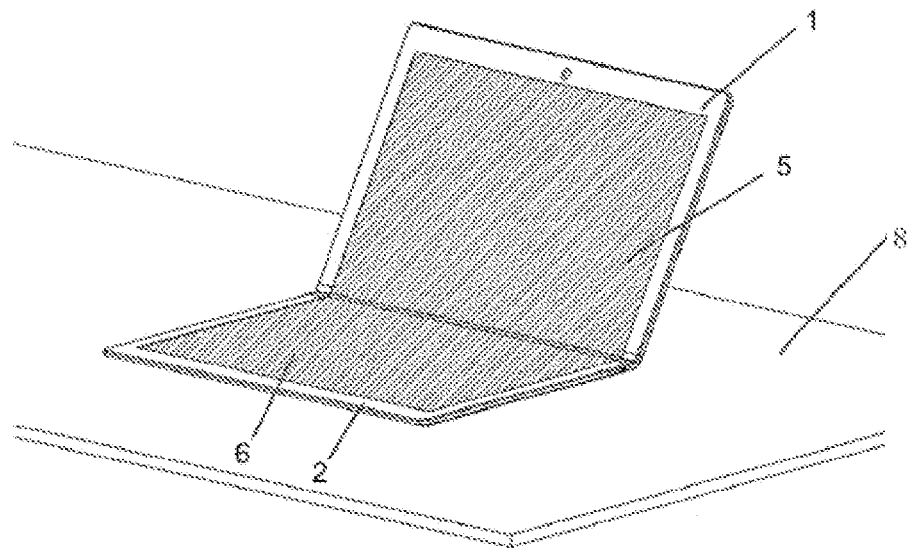
FIG. 9 shows an electronic device according to an embodiment of the present disclosure in an eighth operation mode.

When the rotating device is rotated between 90 and 180 degrees, as shown in FIG. 9, the electronic device according to the embodiment of the present disclosure is in an eighth operation mode; one of the first body 1 and the second body 2 is supported on the support surface 8 (for example, the second body 2 is supported on the support surface 8 in FIG. 9); one of the first display screen 5 and the second display screen 6 of the bendable display device is used for displaying data information, the other of the first display screen 5 and the second display screen 6 is used for performing the touch operation, and the flexible display screen 7 is used for displaying the data information and/or performing the touch operation.

Figure 10:
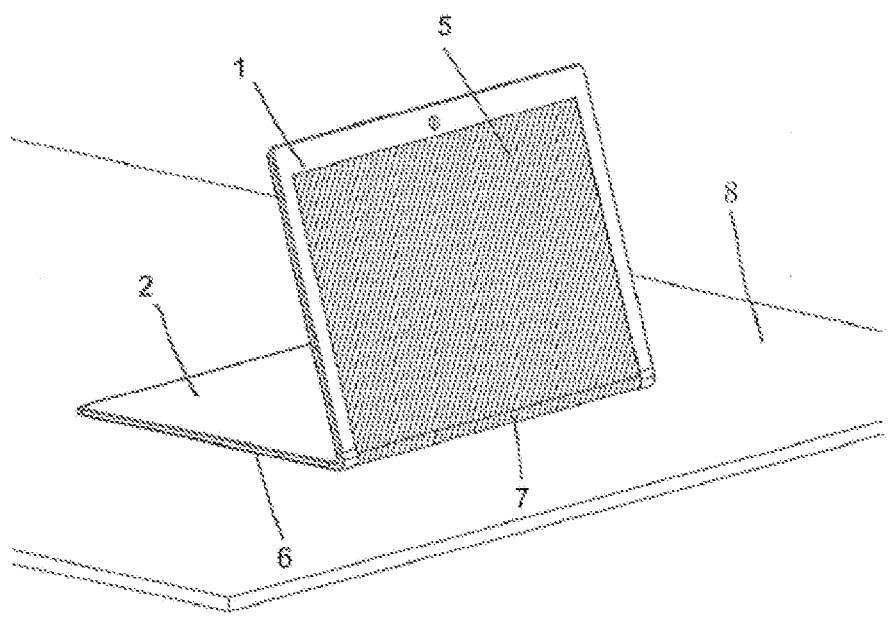
FIG. 10 shows an electronic device according to an embodiment of the present disclosure in a ninth operation mode.

When the rotating device is rotated to more than 180 degrees, as shown in FIG. 10, the electronic device according to the embodiment of the present disclosure is in a ninth operation mode; one of the first body 1 and the second body 2 is supported on the support surface 8; one of the first display screen 5 and the second display screen 6 is used for displaying the data information and/or performing the touch operation, the other of the first display screen 5 and the second display screen 6 faces to a support surface 8 (for example, the second display screen 6 faces to a support surface 8 in FIG. 10), and the flexible display screen 7 is used for displaying the data information and/or performing the touch operation.

Figure 11:
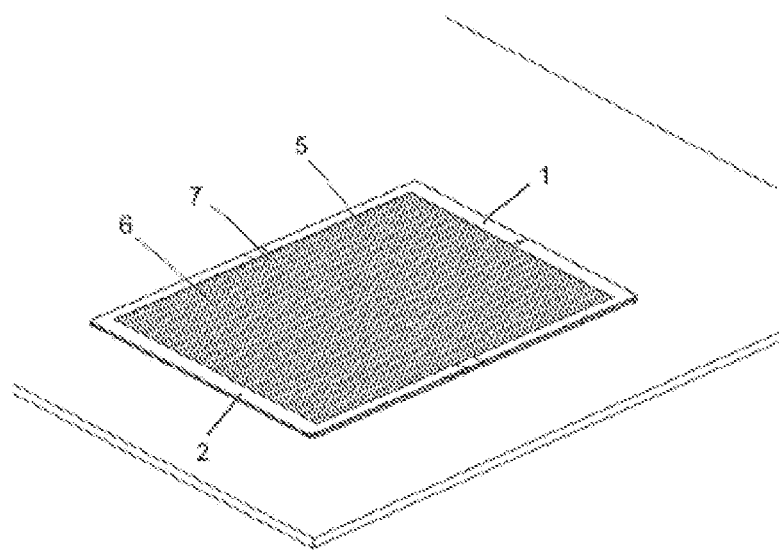
FIG. 11 shows an electronic device according to an embodiment of the present disclosure in a tenth operation mode.

When the rotating device is rotated to 180 degrees, as shown in FIG. 11, the electronic device according to the embodiment of the present disclosure is in a tenth operation mode; and in the tenth operation mode, the first body 1 and the second body 2 rotate relative to each other to be located in a same plane; and in the tenth operation mode, the first display screen 5 and the second display screen 6 are together used for displaying the data information and/or performing the touch operation of the user, and the flexible display screen 7 is used for displaying the data information and/or performing the touch operation.

Figure 12:
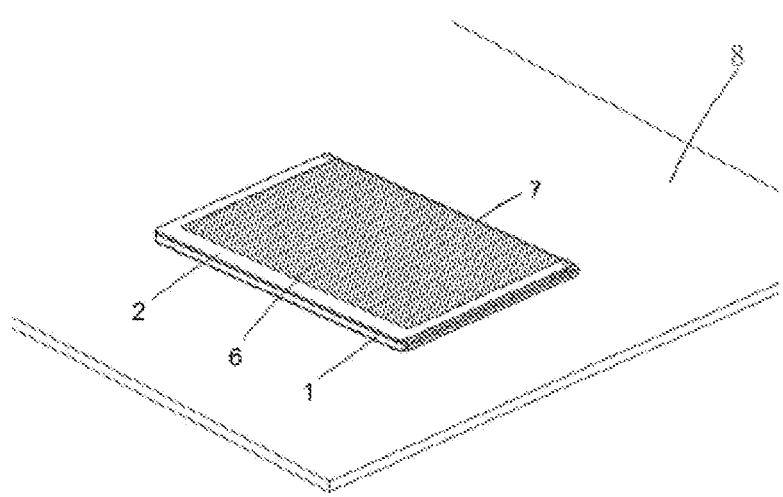
FIG. 12 shows an electronic device according to an embodiment of the present disclosure in an eleventh operation mode.

When the rotating device is rotated to 360 degrees, as shown in FIG. 12, the electronic device according to the embodiment of the present disclosure is in an eleventh operation mode; and in the eleventh operation mode, the first body 1 and the second body 2 rotate relative to each other to contact each other; and in the eleventh operation mode, the first display screen 5 and the second display screen 6 are parallel to each other, and the first display screen 5 and/or the second display screen 6 can be used for displaying the data information and/or performing the touch operation, and the flexible display screen 7 is used for displaying the data information and/or performing the touch operation.

According to a sixth aspect of the present disclosure, during the rotation of the first body 1 and the second body 2, the enclosing mechanism 4 made from a flexible material maintains a smooth state, and no wrinkle is formed on the surface of the flexible material.

The flexible material is silica gel.

As shown in FIG. 13, the rotary fit of the plurality of rotating shafts is achieved by gear fit.

Based on the above structures from the fourth aspect to the sixth aspect of the present disclosure, since no physical keyboard exists and only the display part exists in the electronic device according to the present disclosure, compared with the related art, in the case of the same size, the entire flexile display screen can be used for displaying interactive information, so that the display area is increased, then the area for the information to be displayed is increased, and thus much more convenience is brought to the user when a large amounts of information are required to be displayed.

In addition, since the virtual keyboard is used, the overall size of the keyboard part and the size of each key are variable, and thus corresponding adjustment can be conveniently made according to the operation habits of each user. Further, the way of applying this type of electronic device by the user is varied.

Based on the above structures from the fourth aspect to the sixth aspect of the present disclosure, the electronic device according to the present disclosure does not need to be held by one hand of the user, while the other hand is used for inputting operation instructions. When a large number of input operations are required, in some of the above modes, the electronic device according to the present disclosure needs no additional supporting device, for example, a bracket, and needs no additional external physical keyboard, for example, a physical keyboard in wired or wireless connection with the electronic device. In this way, since the additional supporting device and the additional external keyboard are unnecessary, the portability of the electronic device according to the present disclosure is improved.

In addition, the electronic device according to the present disclosure includes the flexible display screen, namely the bendable display screen. In the rotation of the rotating device, the flexible display screen always maintains the smooth state and can be used for displaying the data information and/or performing the touch operation. Due to the arrangement of the flexible display screen, the way of applying the electronic device according to the present disclosure by the user is varied.

With reference to specific embodiments, although the present disclosure has been described in the description and the accompanying drawings, it should be understood that, those skilled in art to which the present disclosure pertains can make a variety of changes and a variety of equivalents to replace a variety of elements therein, without departing from the scope of the present disclosure defined by the claims. Moreover, the combination or coordination of the technical features, elements and/or functions between the specific embodiments herein are clear and definite, therefore, according to these disclosed contents, those skilled in the art to which the present disclosure pertains can appreciate that the technical features, elements and/or functions in the embodiments can be combined into another specific embodiment as the case may be, unless otherwise described for the above contents. In addition, according to the teachings of the present disclosure, a variety of changes can be made to adapt to special situations or materials, without departing from the essence of the present disclosure. Accordingly, the present disclosure is not limited to individual specific embodiments illustrated by the accompanying drawings, or specific embodiments serving as best embodiments envisaged for implementing the present disclosure and described in the description, and the present disclosure is intended to encompass all embodiments falling within the scope of the above description and the appended claims.

The invention claimed is:

1. An electronic device comprising: a first body; a second body; a rotating device rotatably connecting the first body and the second body; an enclosing mechanism enclosing at least a part of the rotating device and comprising an elastic component, wherein after the elastic component is pre-stretched, the enclosing mechanism is fixed between the first body and the second body; so that when the rotating device is rotated to different angles, the enclosing mechanism is always fit and attached to the rotating device, wherein the rotating device is detachably connected between the first body and the second body, when the electronic device is in a sixth operation mode, a matching part of at least one of the first body and the second body is separable from a fixing part of the rotating device, so that a first display screen of the first body is separable from a second display screen of the second body, and the first display screen and the second display screen are capable of respectively showing display information, wherein the matching part and the fixing part form a mortise and tenon fit.

2. The electronic device of claim 1, wherein the rotating device is configured to rotate between 0 and 360 degrees.

3. The electronic device of claim 2, wherein when the rotating device is rotated to 180 degrees, the electronic device is in a first operation mode, the first body and the second body are located on a same plane, and the first display screen and the second display screen show display information towards a same direction.

4. The electronic device of claim 2, wherein when the rotating device is rotated to more than 180 degrees, the electronic device is in a second operation mode, free ends of the first body and the second body are supported on a support surface, and the first display screen and the second display screen show display information towards two sides.

5. The electronic device of claim 2, wherein when the rotating device is rotated to 360 degrees, the electronic device is in a third operation mode, the first body and the second body are overlapped back to back, and the first display screen and the second display screen show display information towards two opposite directions.

6. The electronic device of claim 2, wherein the tightness of the enclosing mechanism changes with the rotation of the rotating device.

7. The electronic device of claim 2, wherein when the rotating device is rotated between 90 degrees and 180 degrees, the electronic device is in a fourth operation mode, the external surface of one of the first body and the second body is supported on a support surface, and the first display screen and the second display screen show display information towards different directions.

8. The electronic device of claim 2, wherein when the rotating device is rotated to more than 180 degrees, the electronic device is in a fifth operation mode, one of the first display screen of the first body and the second display screen of the second body is supported on a support surface, and the other of the first display screen of the first body and the second display screen of the second body is used for showing display information.

9. The electronic device of claim 1, further comprising a flexible display screen, wherein the flexible display screen is arranged on the enclosing mechanism.

10. The electronic device of claim 9, wherein the rotating device comprises a plurality of rotating shafts which are arranged in parallel and are in rotary fit, so that the rotating device is capable of maintaining a smooth state in a relative rotation of the first body and the second body.

11. The electronic device of claim 10, wherein the flexible display screen also maintains the smooth state in the relative rotation.

12. The electronic device of claim 10, wherein the rotary fit of the plurality of rotating shafts is achieved by gear fit.

13. The electronic device of claim 10, wherein in the relative rotation, the elastic component also maintains a smooth state, with no wrinkle formed on the surface of the elastic component, and the elastic component comprises silica gel.

* * * * *